(12) United States Patent
Berlioz et al.

(10) Patent No.: US 6,204,779 B1
(45) Date of Patent: Mar. 20, 2001

(54) COMBINED ALTITUDE AND HEIGHT-ABOVE-GROUND INDICATOR FOR AN AIRCRAFT

(75) Inventors: Raymond Jacques Gerard Berlioz, Salon-de-Provence; Vincent Frederic Saintagne, Velaux; Joel Christian Roger Astruc, Puyricard, all of (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 09/191,371

(22) Filed: Nov. 13, 1998

(30) Foreign Application Priority Data

Nov. 13, 1997 (FR) .................................................. 97 14219

(51) Int. Cl.⁷ .................................................. G08B 23/00
(52) U.S. Cl. .................... 340/970; 340/973; 340/974; 340/977; 73/178 R; 342/121; 342/176
(58) Field of Search .................... 340/970, 977, 340/903, 904, 973, 974, 975, 976, 990, 995; 342/176, 121; 73/384, 386, 178 R

(56) References Cited

U.S. PATENT DOCUMENTS

| 3,580,080 | * | 5/1971 | Perkins | 73/384 |
| 3,595,077 | | 7/1971 | Perkins | 73/178 R |
| 5,136,301 | * | 8/1992 | Bechtold et al. | 342/176 |
| 5,359,890 | * | 11/1994 | Fulton et al. | 73/178 R |
| 5,369,589 | * | 11/1994 | Steiner | 701/200 |
| 5,412,382 | * | 5/1995 | Leard et al. | 340/974 |
| 5,844,504 | * | 12/1998 | Etherington | 340/973 |
| 5,952,570 | * | 9/1999 | Berlioz et al. | 73/178 H |

FOREIGN PATENT DOCUMENTS 2273260  12/1975  (FR) .
2372417   6/1978  (FR) .

* cited by examiner

*Primary Examiner*—Edward Lefkowitz
*Assistant Examiner*—Davetta W. Goins
(74) *Attorney, Agent, or Firm*—Stevens, Davis, Miller & Mosher, L.L.P.

(57) ABSTRACT

A combined altitude and height-above-ground indicator for an aircraft includes a first sensor and a second sensor which respectively sense altitude and height-above-ground, a processor for processing the information supplied by the first and second sensors, and a display for displaying the altitude and height-above-ground information, showing the two items of information against each other, on the same scale against at least one pointer.

4 Claims, 2 Drawing Sheets

COMBINED ALTITUDE AND HEIGHT-ABOVE-GROUND INDICATOR FOR AN AIRCRAFT

Figure 1:
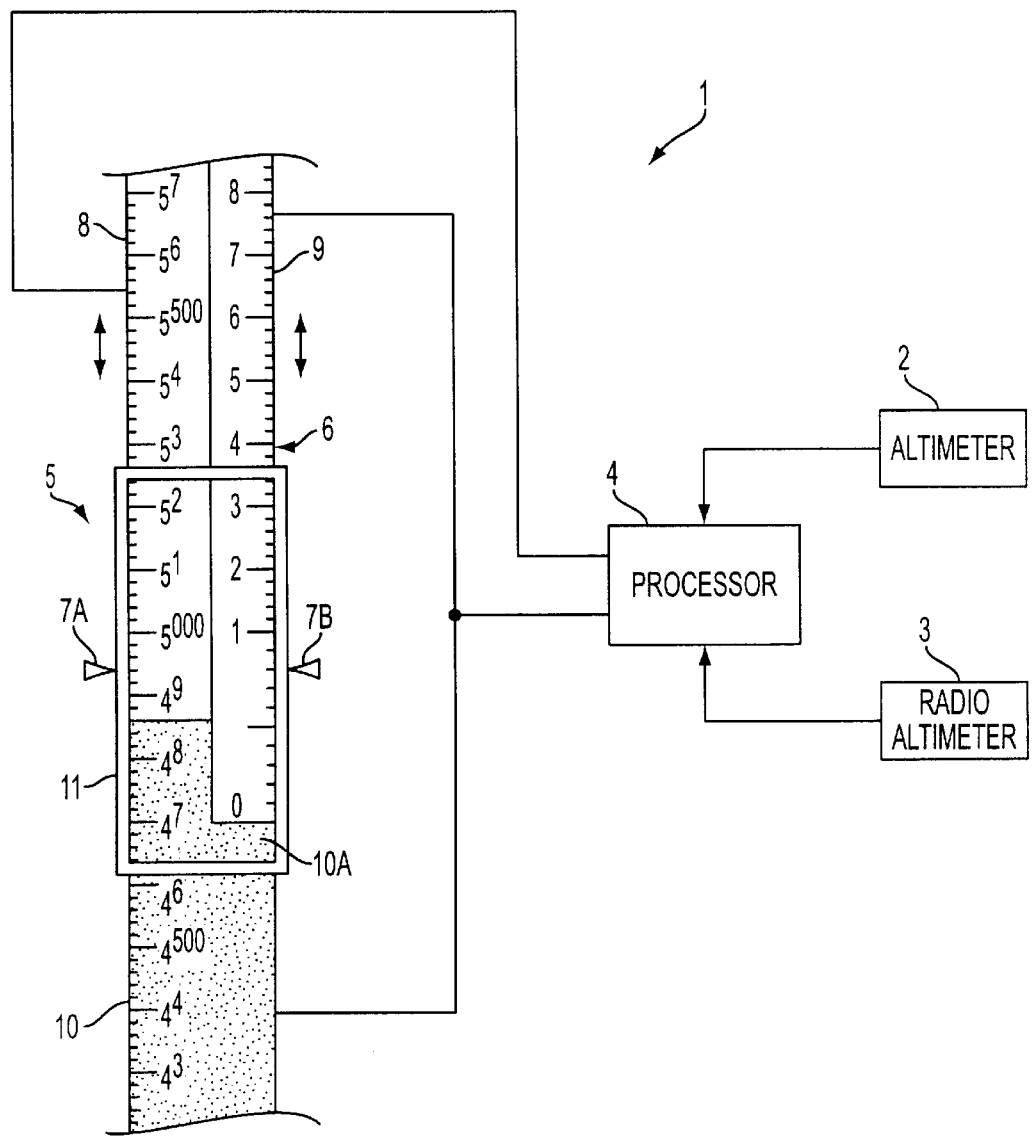

The present invention relates to a combined altitude and height-above-ground indicator for an aircraft.

Although not exclusively, it is more particularly suited to helicopters liable to travel at low or very low heights above the ground.

Present-day altimeters present altitude information which simply shows a flying level given with respect to a fixed reference updated by the pilot. Furthermore, the height of the aircraft above the ground being overflown, measured by a radio altimeter, has to be consulted from another device, which has a different layout and a different origin. The altitude information and the height-above-ground information are therefore currently shown on two physically separate indicators which have different resolutions and different references even though they deal with the same physical parameters. These two items of information need to be monitored and correlated with one another during some phases of flight, and this leads to a heavy workload for the pilot.

However, American U.S. Pat. No. 3,580,080 describes a combined indicator comprising:
- a first sensor and a second sensor which respectively sense altitude and height above ground,
- means of processing the information supplied by said first and second sensors, and
- means of displaying said information, showing said two items of information against each other to the same linear and vertical scale, comprising a first part represented by a graduated strip showing the altitude and a second part represented by a graduated strip, adjacent to the first one, showing the height above the ground.

In such a known combined indicator, two moving pointers which are independent of one another are provided, which means that this indicator is difficult for the pilot to read.

The present invention intends to overcome this drawback.

To this end, according to the invention, the combined indicator of the type mentioned hereinabove is noteworthy in that said first and second parts respectively scroll past first and second stationary pointers and said pointers are at the same level.

Thus, the invention makes it possible to show, on a single indicator, with the same reference, the information regarding the pressure altitude and the information regarding the height above the ground being overflown. This indicator allows the pilot monitoring the flight altitude of the aircraft also to see clearly how much height remains between the aircraft and the ground when this ground is approaching. The pilot can thus see the ground "rise up" toward the current-altitude or height pointer and is thus alerted to an excessive decrease in this height: he can therefore control this using the indicator of the invention.

Advantageously, the resolution of the second part of the scale is greater once a certain ground-proximity threshold has been crossed.

According to another feature of the invention, the indicator comprises a strip scrolling past under the strip showing the altitude and indicating the ground, masking the background of the indicator for altitude levels which are below the measured height from the ground.

According to yet another feature of the invention, the indicator comprises a window, the size of which is smaller than the operating ranges shown by said strips and through which a portion of each of the latter can be seen.

The figures of the appended drawing will make it easy to understand how the invention may be achieved. In these figures, identical references denote similar elements.

FIG. 1 diagrammatically illustrates one embodiment of an altitude and height-above-ground indicator for an aircraft according to the invention.

Figure 2:
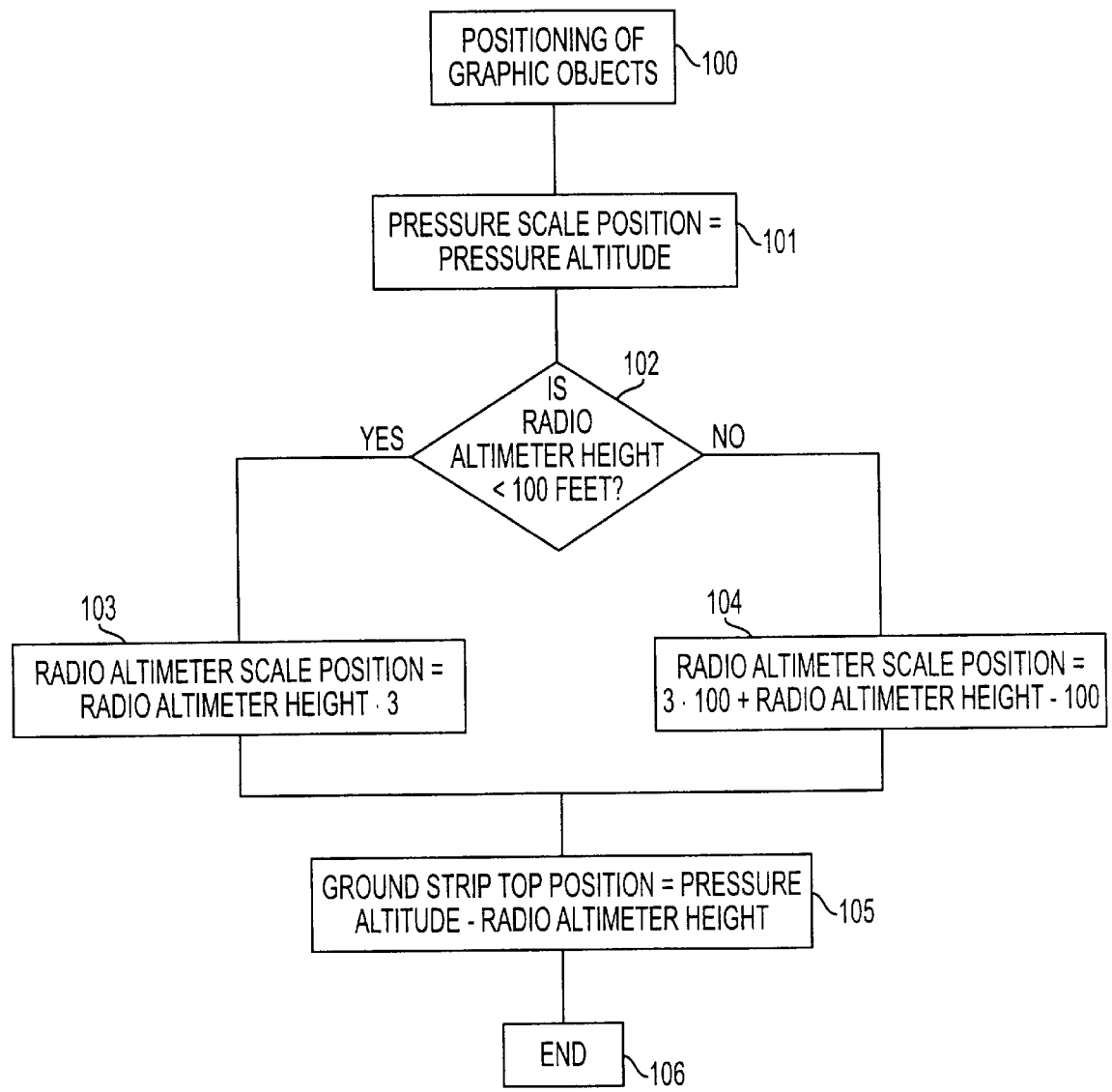

FIG. 2 illustrates an operating algorithm.

With reference to FIG. 1, the altitude and height-above-ground indicator 1 for an aircraft, comprises:
- a first sensor 2 which senses pressure altitude (altimeter),
- a second sensor 3 which senses the height above the ground (radioaltimeter),
- means 4 of processing the information supplied by the sensors 1 and 2, and
- means 5 of displaying said altitude and height-above-ground information, which show said two items of information against each other on the same scale 6 against two stationary pointers 7A and 7B at the same level.

More specifically, the vertical linear scale 6, in the embodiment of FIG. 1, is split into two main parts:
- the "transparent" first part 8 which represents the display of a pressure altitude, shown as a strip which can be graduated in feet (as depicted) showing the altitude (particularly with respect to sea level) and scrolling past the stationary pointer 7A,
- the second 9 which represents the display of a radio altimeter, featured in the form of a strip adjacent to the first one, which can be graduated in feet (×100 in the figure) showing the height above ground and scrolling past the stationary pointer 7B, at the same level as the pointer 7A. As can be seen in FIG. 1, the resolution of this display is greater (for example 3 times greater) once a certain ground proximity threshold (for example 100 feet) has been crossed.

The advantages of the indicator according to the invention are as follows:
- the close proximity of the two parts of the scale reduces the visual scanning required to consult them,
- the increased speed with which the part of the height scale scrolls past when the ground is close by alerts the pilot to the fact that an abnormal situation has arisen,
- the close proximity of the parts of the scale makes it easier for these to be correlated with one another,
- the use of the same resolutions and of the same reference makes the reading and interpretation of the variations of the two parts of the scale easier, particularly in phases in which the pilot needs to make a correlation between them.

The display means 5 therefore comprise, in the embodiment depicted in FIG. 1:
- a graduated strip 8, which can move vertically, showing in feet the entire operating range of the pressure altimeter, and the graduations of which are "orientated" towards the left in the figure,
- a graduated strip 9, which can move vertically, facing the strip 8, showing in feet the entire operating range of the radio altimeter, and the graduations of which are "orientated" towards the right in the figure,
- two stationary pointers 7A, 7B, positioned at the same level on each side of said strips, one to the left of the strip 8 and pointing to the current altitude, and the other to the right of the strip 9 and pointing to the current height above the ground that is be overflown,
- a strip 10 scrolling past between the graduations and the background of the strip 8 and indicating the ground, and a window 11, the size of which is smaller than the operating ranges shown by the strips 8 and 9, and through which a portion of each of the latter can be seen.

The way in which the indicator depicted in FIG. 1 works is thus as follows:

the strip 8 moves vertically past the pointer 7A which is stationary and identifies the analogue altitude value. Only a portion of the strip 8 is seen through the reading window 11, and its movement is controlled by the altitude information produced by the sensor 2 and processed by the processing means 4, the strip 10 moves vertically over the background of the strip 8. It covers it for altitudes for which the height is less than 0. Its movement is controlled by the height-above-ground information produced by the sensor 3 and processed by the processing means 4, the strip 9 moves vertically past the pointer 7B which is stationary and points to the current analogue height value. Only a portion of the strip 9 can be seen through the reading window 11. Its movement is also controlled by the height-above ground information produced by the sensor 3 and processed by the processing means 4.

In summary, the above indicator, produced using mechanical or computerized means, is defined as follows:

the strip 8 shows the altitude scale. Its operating range can be defined from −2000 to 30,000 feet, the mask 10 shows the ground; this can cover the entire operating range of the altitude scale, the strip 9 displays the height scale. Its operating range may be defined from 0 to 3000 feet. From, for example, 100 to 3000 feet, this has the same resolution as the altitude scale. From 0 to 100 feet, the resolution is greater, for example three times greater.

The strip 8 scrolls past in the window 11 to show the current altitude, measured by a pressure altimeter, under the stationary pointer 7A, situated at the middle of the reading window. The position of the pointer 7A is defined in such a way that a portion of strip 8 corresponding, for example, to ±300 feet, can be seen on each side of the pointer.

The mask 10, which corresponds to the ground, scrolls past over the background of the strip 8 so that its upper edge is positioned at the current altitude minus the height above ground measured by a radio altimeter. It covers the background of the strip 8 over all of its lower part.

The strip 9 scrolls through the window 11, so as to show the current measured by a radio altimeter, under the stationary pointer 7B. The ground is visible (10A) below the zero value of the strip.

The operating algorithm can be defined as follows, with reference to FIG. 2:

100: positioning of graphic objects

101: position of pressure scale=pressure altitude

102: radio altimeter height <100 feet

103: if YES: radio-altimeter scale position=radio altimeter height *3 (resolution multiplied by 3), 104: if NO: radio altimeter scale position=3×100 plus radio altimeter height minus 100, 105: ground strip top position=pressure altitude minus radio altimeter height, 106: end.

To sum up, the invention makes it possible to display, on a single indicator with a single point of reference, the information concerning the altitude and the information concerning the height with respect to the ground overflown.

These indications have the same resolution, which means that they are easy to correlate and that the two items of information can operate identically. The height indication does, however, have better resolution close to the ground: the accuracy is greater and the faster rate of travel will attract the pilot's attention to the approaching ground.

In other words, the expansion of the radio altimeter scale in proximity to the ground increases the rate at which the corresponding strip scrolls compared with that of the pressure altitude strip. In consequence, the crew's attention is alerted during the tricky phases of flight such as take-offs and landings.

It will thus be understood that errors in the calibration of the instrument are also readily detectable. For example, an error in the calibration of the device in QFE situation (the pressure prevailing at the reference level of the take-off strip) will manifest itself in a difference between the pointer of the altimetric scale and the strip showing the ground when the aircraft is on the ground. Likewise, when overflying the sea, an error in the calibration of the indicator in QNH mode (the pressure that has to be displayed for the altimeter to indicate the topographical altitude at the point in question) will show, on the ground, an altitude against the left-hand pointer which differs from the set altitude (or so-called displayed altitude, the latter incidentally being adjustable and shown on the screen of the instrument).

What is claimed is:

1. A combined altitude and height-above-ground indicator for an aircraft, comprising:

a first sensor and a second sensor which respectively sense altitude and height-above-ground information;

means for processing the altitude and height-above-ground information supplied by said first and second sensors, respectively; and means for displaying said altitude and height-above-ground information, showing said altitude and height-above-ground information against each other to a same linear and vertical scale, comprising a first part represented by a first graduated strip showing the altitude and a second part represented by a second graduated strip, adjacent to the first graduated strip, showing the height-above-ground, wherein said first part scrolls past a first stationary pointer, and movement of said first part is automatically controlled by the altitude information produced by the first sensor and processed by the means for processing, wherein said second part scrolls past a second stationary pointer, and movement of said second part is automatically controlled by the height-above-ground information produced by the second sensor and processed by the means for processing, and wherein said first and second stationary pointers are stationary at the same level.

2. The indicator as claimed in claim 1, wherein a resolution of the second part of the scale is greater once a certain ground-proximity threshold has been crossed.

3. The indicator as claimed in claim 1, further comprising a strip scrolling past under the first graduated strip showing the altitude and indicating the ground, masking the background of the indicator for altitude levels which are below the sensed height-above-ground.

4. The indicator as claimed in claim 1, further comprising a window having a size which is smaller than the operating ranges shown by said first and second graduated strips and through which a portion of each of the latter can be seen.

* * * * *